United States Patent [19]
Juran et al.

[11] Patent Number: 5,816,874
[45] Date of Patent: Oct. 6, 1998

[54] REMOTE UNDERWATER SENSING STATION

[75] Inventors: Duane C. Juran, Shoreview; Alan W. Cibuzar; Gordon J. Johnson, both of Brainerd, all of Minn.

[73] Assignee: Regents of The University of Minnesota, Minneapolis, Minn.

[21] Appl. No.: 747,218

[22] Filed: Nov. 12, 1996

[51] Int. Cl.⁶ .......................... B63B 22/00; B63B 22/04; B63B 22/20
[52] U.S. Cl. .................. 441/1; 441/23; 441/29; 441/32
[58] Field of Search .................. 441/1, 2, 11, 21, 441/23, 28, 29, 33, 32; 114/293; 73/170.29

[56] References Cited

U.S. PATENT DOCUMENTS

| | | | |
|---|---|---|---|
| 3,455,159 | 7/1969 | Gies, Sr. | 73/170.29 |
| 3,590,635 | 7/1971 | Duing | 441/23 |
| 3,986,159 | 10/1976 | Horn | 441/33 |
| 4,138,752 | 2/1979 | Dickson | 9/8 |
| 4,155,673 | 5/1979 | Yashima | 114/293 |
| 4,677,931 | 7/1987 | Buckle | 114/331 |
| 4,924,698 | 5/1990 | Echert et al. | 73/170 A |
| 5,007,364 | 4/1991 | Buckle | 114/331 |
| 5,066,338 | 11/1991 | Meyers | 136/244 |
| 5,224,074 | 6/1993 | Sullivan | 367/3 |
| 5,228,406 | 7/1993 | Marini et al. | 114/331 |
| 5,283,767 | 2/1994 | McCoy | 367/4 |
| 5,449,307 | 9/1995 | Fuereder | 441/2 |

*Primary Examiner*—Sherman Basinger
*Attorney, Agent, or Firm*—Westman, Champlin & Kelly, P.A.

[57] ABSTRACT

A portable, anchored sensor module for collecting fresh water environmental data over a range of depths, is supported relative to a buoy having a power supply and control circuitry. A depth control housing supports the underwater sensor module. The depth control housing can be controlled as to its buoyancy for supporting the sensor module at selected depths and collecting data at such depths. The control circuitry includes capabilities for transmitting data on suitable frequencies, such as those for a cellular phone, and has a computer with memory for storing the sensor signal for remote call up. Periodically the sensor information may be transmitted to a remote station used for control. The remote station also can control the depth from which the sensors are taking data.

14 Claims, 4 Drawing Sheets

REMOTE UNDERWATER SENSING STATION

BACKGROUND OF THE INVENTION

The present invention relates to an underwater sensor module that senses selected parameters of water. The sensor module is supported by an anchored buoy having a solar power source, a transmitter and receiver for receiving and sending data and having controls for the sensor module.

In the prior art, various oceanographic instrument packages have been developed for determining information about water quality. U.S. Pat. No. 5,283,767 shows a free drifting instrument package that will collect environmental data over a range of depths. A locating system is used for determining the position of the apparatus when it is transmitting data.

Various types of underwater buoys are used for determining water parameter as well as the depth of flotation of the buoy below the surface, such as shown in U.S. Pat. No. 5,224,074. This type of buoy gives a series of sequential vertical arrays of information.

The buoy supported surveillance apparatus that is provided in U.S. Pat. No. 5,449,307 also is capable of being moved vertically, but in this case equipment above the water surface is raised and lowered, as well as submerged. In patent '307 a stabilizing chamber is equipped with pumps for intake and discharged water for allowing the adjustment of the buoyancy of each satellite station.

SUMMARY OF THE INVENTION

The present invention relates to a sensing station including a support buoy for housing solar cells and which provides support for and guidance of a sensor module that has a housing supported below the surface of water. The sensor module can be adjusted as to depth through the use of a pump for injecting water into a sealed air filled chamber of a buoyant depth control housing or pumping water out of the depth control housing, depending on the depth desired for sensing parameters of the water.

The support buoy is shaped, in the preferred embodiment, as a floating housing or pod having a center housing forming a chamber, with radially extending arms also forming chambers. The arms shown provide for stability, and each arm supports an individual solar panel or solar cell array, and provides interior space for batteries used as power storage sources for the instruments. A data handling circuit and other communications and control equipment is supported in the center housing of the buoy or pod. The data handling circuitry receives signals from sensors that are supported below the water surface. The data processing circuitry will process the data and transmit the signals or data to a remote station in real time, or an on-board memory can store the information for later transmission. On-board memory also can be read by an operator who visits the support buoy at intervals.

The sensor module is free to descend in or strong current situations may be guided vertically as it moves to different depths through the use of a vertically extending, weighted cable. The depth of the sensors can be precisely determined even in the wake of storms. By having the support buoy or pod anchored securely, the sensors will remain in a known position and reliably transmit data from the sensors back to the station.

The sensors are used for measuring any desired water environmental quality factors, such as pH, conductivity, dissolved oxygen, temperature, turbidity, redox potential and the like at selected depths, which information is provided by depth sensors. Additionally, sensors for sensing the content of phosphorous, total nitrogen, fecal coliform and chlorophyll can be incorporated into the sensor module.

The sensors are selected to have low power requirements, and are commercially available. Various sensors can be selected for use, as desired.

The solar cells utilized for power sources are also available commercially, and are selected to provide an adequate output to keep the storage batteries charged. The batteries preferably will have a full charge life of at least two weeks to accommodate cloudy periods when the solar cells are not fully functional.

The support buoy can be maintained in or on the top of an ice pack if the body of water freezes over. The sensors will all be in water below the ice, including the pump for pumping water into and out of the depth control chamber for the sensor module. A micro computer is used, and is controlled by suitable software, to not only periodically sample and analyze the output of the sensors, and either store or transmit the data. The data is graphically displayed at the base station.

The depth control pump is run in short bursts to add water to the sealed depth control chamber of the sensor module to achieve the desired depth, which is again sensed with a sensor. The sensor module thus is raised and lowered in short intervals. The pump is controlled to operate to inject water into the depth control housing chamber, and can be reversed to pump water out of the depth control housing chamber back into the body of water when the sensor package is to be raised. The air in the sealed depth control housing chamber will be compressed as the water is pumped into it.

DETAILED DESCRIPTION OF THE PREFERRED EMBODIMENTS

Figure 1:
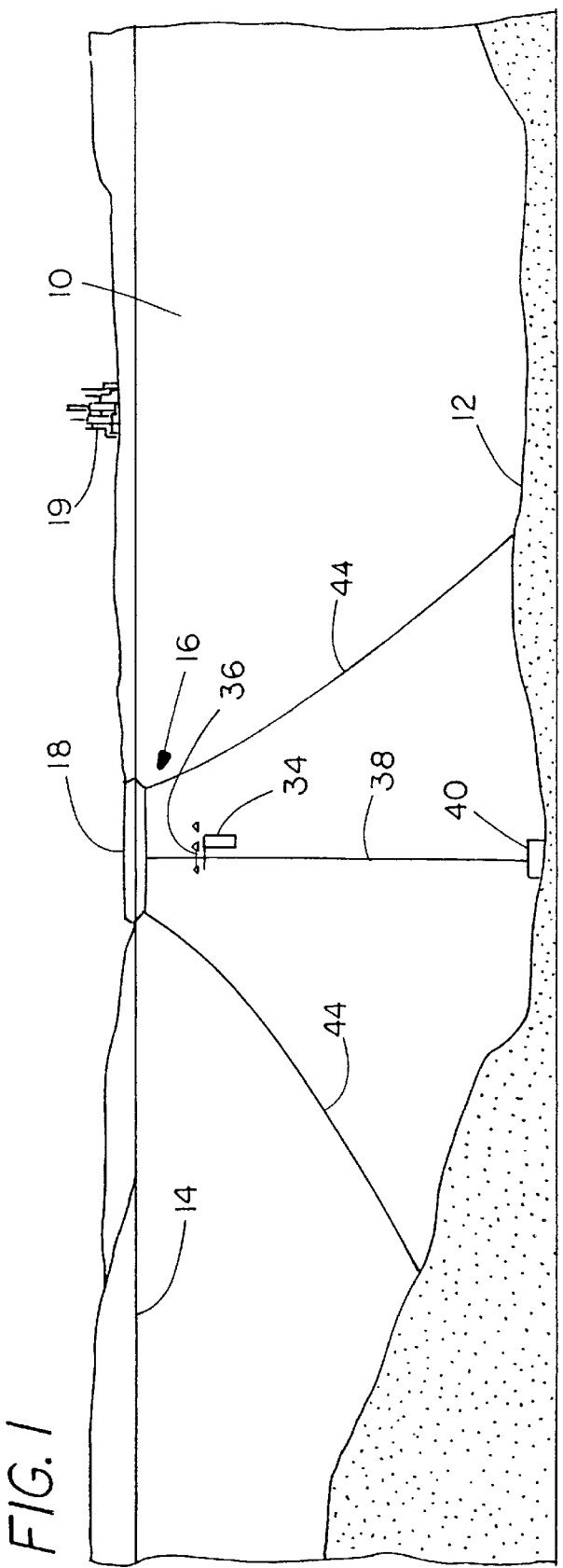
FIG. 1 is a schematic representation of a typical body of water having a remote underwater sensing system including a support buoy made according to the present invention installed therein.
Figure 2:
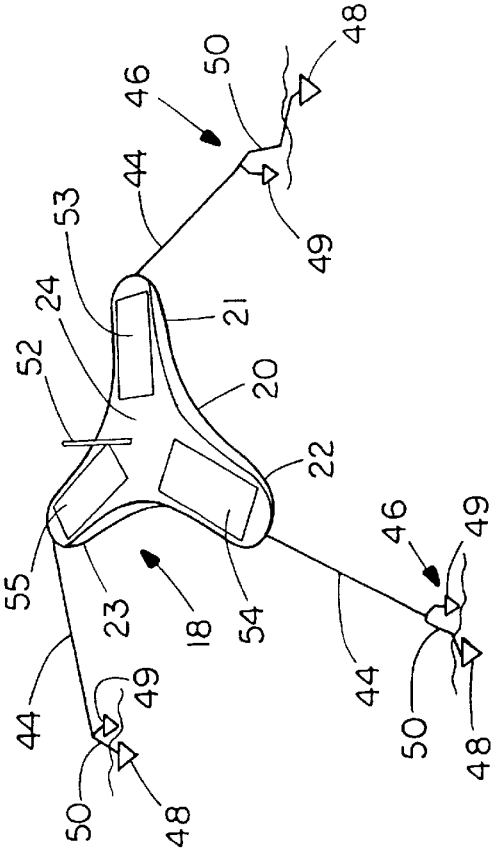
FIG. 2 is a schematic perspective view of a typical buoy used with the present invention.

Referring to the schematic diagram of FIG. 1, a body of water indicated at 10 has a bottom 12, and a shoreline 14 that is shown as an irregular profile. The remote underwater sensing system indicated generally at 16 includes a support buoy or pod 18 which, as shown in FIG. 2, is a generally three-pointed star shaped body 20 that has first, second and third arms 21, 22 and 23 that extend radially from a central housing portion 24 that forms an interior compartment 26 as shown in FIG. 3.

Figure 3:
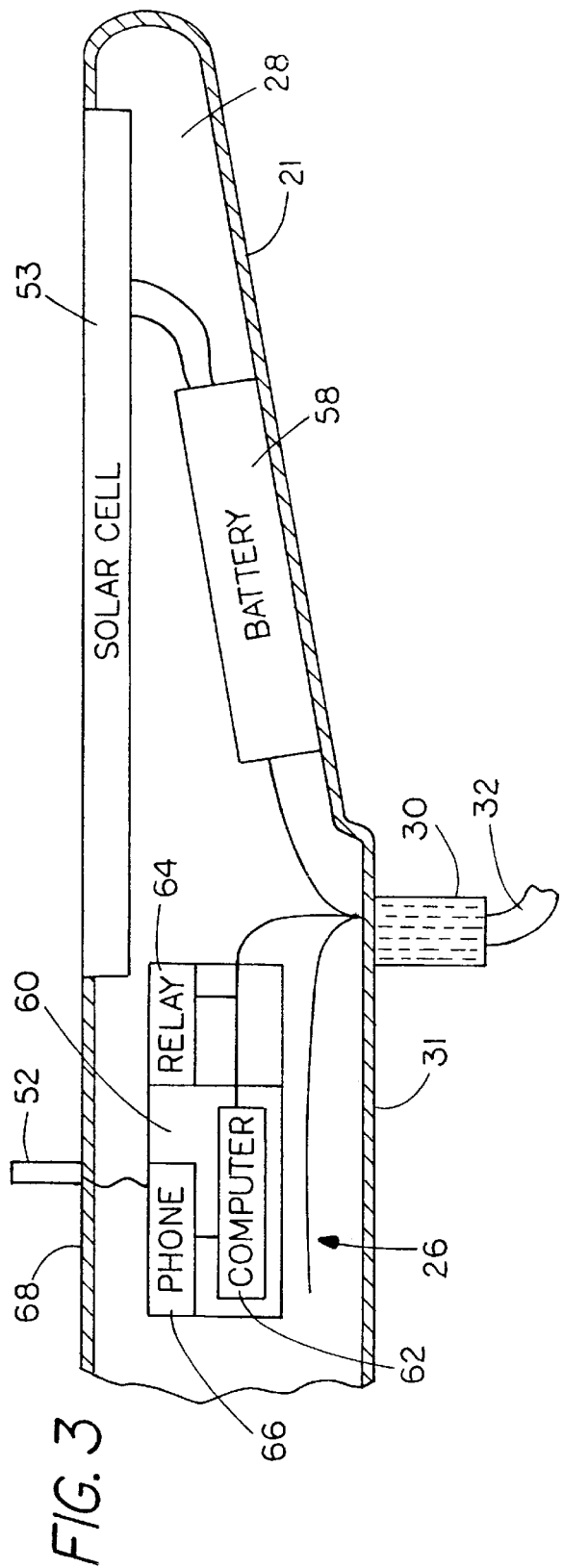
FIG. 3 is a part schematic sectional view of the buoy of FIG. 2 taken through one of the radially extending arms of the buoy.

One of the radial arms 21 is illustrated in FIG. 3 in cross section. Each arm is hollow to form an interior chamber 28 that is sealed from the environment and provides flotation.

A fitting 30 is provided on a bottom wall 31 for carrying necessary electrical cables and the like indicated at 32 to a sensor module 34. The sensor module 34 is controlled or regulated as to depth with a depth control housing or module 36.

The sensor module 34 is connected to the depth control housing 36 through suitable connections as will be shown, and is optionally guided by a vertical guide cable 38 that is anchored with a weight 40. The cable 38 extends from the bottom of the buoy 18. The sensor module will move up and down along the cable 38 as controlled by the depth control housing 36. The length of the cable 38 can be adjusted when the station 16 is installed.

In the form of the invention shown, there are three anchor lines 44, that are used. A separate anchor line 44 extends from the outer end of each of the radial arms of the support buoy or pod 18. An anchor weight assembly 46 for each anchor line is schematically shown. Each anchor weight assembly 46 includes a main anchor weight 48, and a lighter weight 49 connected with a cable, line or other flexible member 50. The anchor lines 44 are connected to the respective weight assembly 46 between the weights 48 and 49. This arrangement will permit the buoy 18 to move slightly laterally by lifting the weight 49 of each of the sets, depending on the loads on the buoy or pod due to wave action, wind and the like.

The center housing portion 24 of the buoy or pod carries a suitable antenna 52 connected to transmitter and receiver equipment, and as shown, the arms or sections 21, 22 and 23 have solar cells 53, 54 and 55 thereon. The solar cells face upwardly toward the sun. The solar cells 53, 54 and 55 are commercially available solar cells and are designed to provide an adequate amount of energy when exposed to sunlight to maintain the charge in suitable batteries. As shown in FIG. 3, the arm or section 21 has a battery 58 mounted in the interior chamber of the arm. Each of the other arms also have a battery 58 that is charged by the respective solar cell. Placing the batteries into the individual arms provides for better distribution of weight for stability, and also separates the batteries so that if a particular portion of the buoy was flooded, the other batteries would not be affected.

The chamber 26 in the center housing is used for mounting a control circuitry package indicated at 60, which, as shown includes a computer or processor 62, suitable relays and controls 64 for a pump that will be used and a remote communications instrument 66 which in the form shown can be a cellular telephone with a preset number for transmitting and for receiving information through the antenna 52. The buoy chamber 26 is sealed (water tight), but can have an access panel indicated at 68 in the center portions for accessing the instrument package 60 as desired.

The buoy 18 can be suitably sized for maintaining the necessary sensor instruments afloat, and for provide support and stability for control of the vertical guide cable or line 38.

Figure 4:
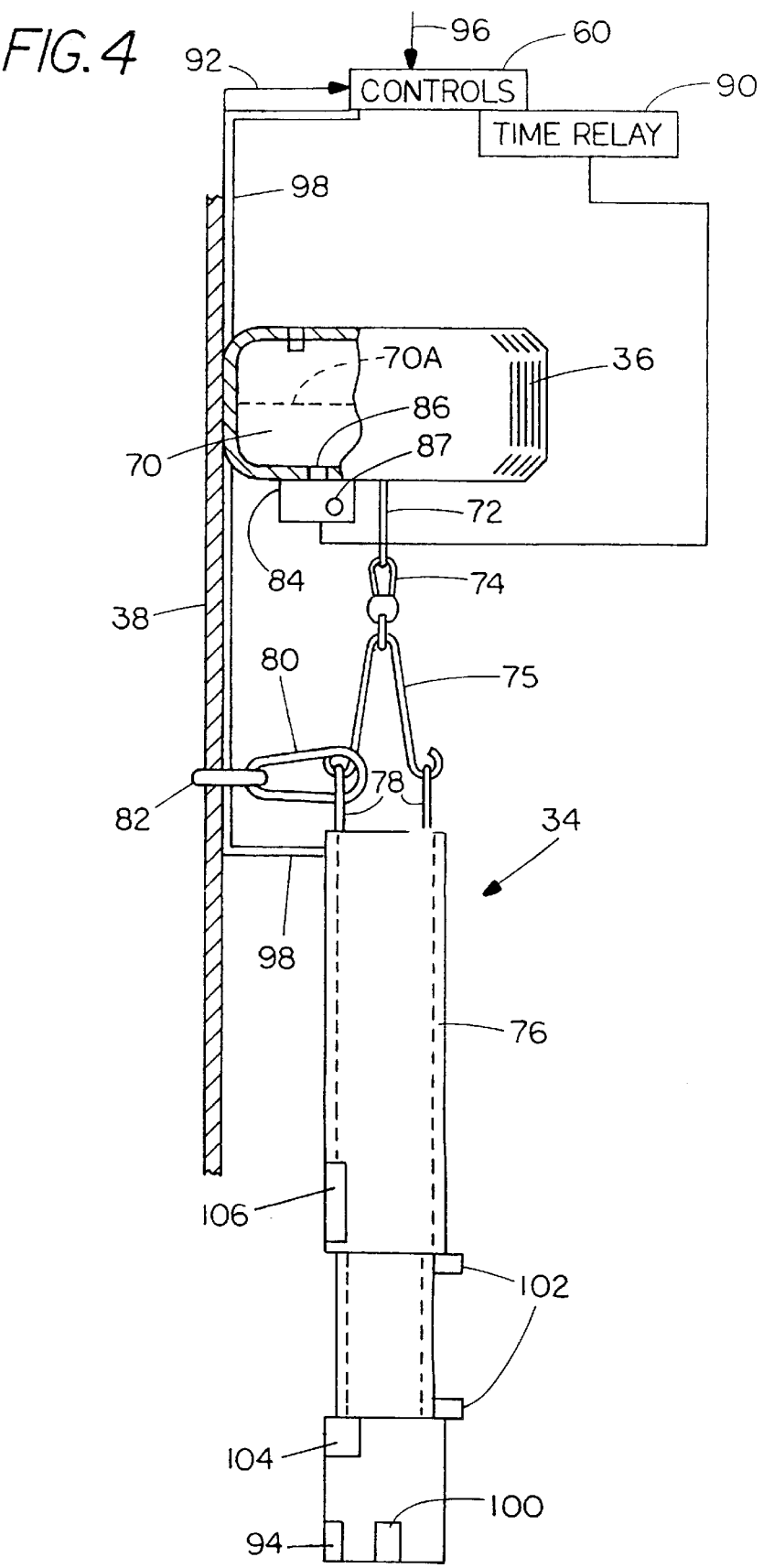
FIG. 4 is an enlarged side elevational view of a typical arrangement for a depth control chamber and sensor module used with the present invention.

Referring to FIG. 4, the depth control housing 36 is illustrated, along with the cable 38 and the sensor module 34. The depth control housing 36 forms a sealed chamber 70, that is normally filled with air but which can be charged with water from the body of water or lake 10 to adjust the buoyancy and thus the depth of the depth control housing 36. The depth control housing 36 has an eye bolt 72 on the bottom wall thereof, which is used with a suitable snap 74 and a hanger 75 for supporting the sensor package 34 from the depth control housing 36. The snap 74 can be a swivel snap, if desired. The sensor module has a housing 76 which is cylindrical for convenience, and the upper wall has a pair of loops or handle members 78 on which a hanger 75 is attached. A swivel snap 80 is also fastened onto one of the handles 78. The snap 80 supports a ring 82. The ring 82 is of size to receive the cable or line 38 and easily slide up and down the cable 38 as the buoyancy in the depth control housing 36 changes.

In order to change the buoyancy of the depth control housing 36, a pump 84, which is schematically shown is mounted on and carried with the depth control housing 36. The depth control housing 36 has a port 86 through the bottom wall, which is sealingly connected to a port of the pump 84 to permit introduction of water into the interior chamber 70. The pump 84 has a second port 87. Port 87 is in the water since the depth control housing 36 is submerged in use. The pump 86 has a reversible motor and when pump 86 is energized in a first direction it will pump water from the body of water 10 and into the chamber 70. The air in chamber 70 will compress as water is pumped in. When pump 84 is reversed it will draw water from the chamber 70, for example water below the water level indicated at 70A by dotted lines, and discharge the water into the body of water 10 through the pump port 87.

The pump 84 is controlled through a timed relay 90 from the control circuitry 60 and the relay 64. The timed relay 90 is such that the pump 84 will be energized only in short bursts in response to a signal from the sensor and control computer or circuit that the depth control housing 36 should change in depth. A signal provided along a line 92 in FIG. 4 from a depth control sensor 94 shown in FIG. 4 indicates the actual depth of the depth control housing.

When the signal indicating the depth from sensor 94 is other than that which is programmed at an input line 96, (which carries a set point signal) the timed relay 90 will provide a short burst to the pump 84 and it will either cause addition of or removal of water from the interior chamber 70.

A change in the level of the water indicated at 70A inside the chamber 70 will cause the ring 82 and the sensor module 34 to slide up or down the cable 38 to the desired level until the signal from the depth sensor will correspond to the set point input signal on line 96. The input signal on line 96 can be preprogrammed using the computer memory, or can be received by the telephone for changing the depth and then processed through the computer 62 and the control circuitry 60.

The sensor module 34 and its housing 76 are shown only schematically. In addition to the depth sensor 94, additional sensors also shown schematically on the sensor module 34 are placed into service. Suitable conditioning circuitry used with various sensors can be mounted in the housing 76, so that the signals received from the sensors will be amplified. Power can be carried to the sensors and signals returned through a cable 98 leading to the control circuitry and connected to leads 32. The cable 98 can either be supported along the cable 38 (as long as the ring 82 does not interfere) or it can be a free line that merely extends from the buoy 18 through a desired type of a retracting reel or it can be free floating. The cable 98 comprises leads from the control circuit to the sensors in the sensor housing 76.

The lines and cables used can be held together with aluminum rings or plastic ties so that they do not tend to foul, and if desired suitable floats of low buoyancy can be provided to float the power and signal cables from the sensor module.

In the form shown, in addition to the depth sensor 94, a pH sensor 100 is provided. The pH sensor 100 is used for sensing the pH of the water, which is an environmental parameter that is desired. A turbidity sensor 102 can also be provided to indicate the turbidity of the water and provide a signal to the computer 62 that is part of the control circuitry 60.

The turbidity sensor 102 also is a standard sensor available commercially for determining the turbidity of the water.

Another parameter or condition of interest is the dissolved oxygen in the water. A suitable dissolved oxygen sensor 104 can be mounted on the housing 76, and it will provide a signal indicating the dissolved oxygen back to the control circuitry 60 for processing and recording in memory or transmitting by telephone or transmitter 66.

A temperature sensor 106 is provided in a suitable location on the housing 76. The temperature sensor can be a thermister mounted as a thin film device on the exterior of the housing 76 with sealed connections going to the interior. The temperature sensor can also be a sensor on the interior surface of the wall of the housing 76. Since the wall of the housing 76 may be made of aluminum there is good thermal conductivity from the water in the body of water 10 to the sensor.

Figure 5:
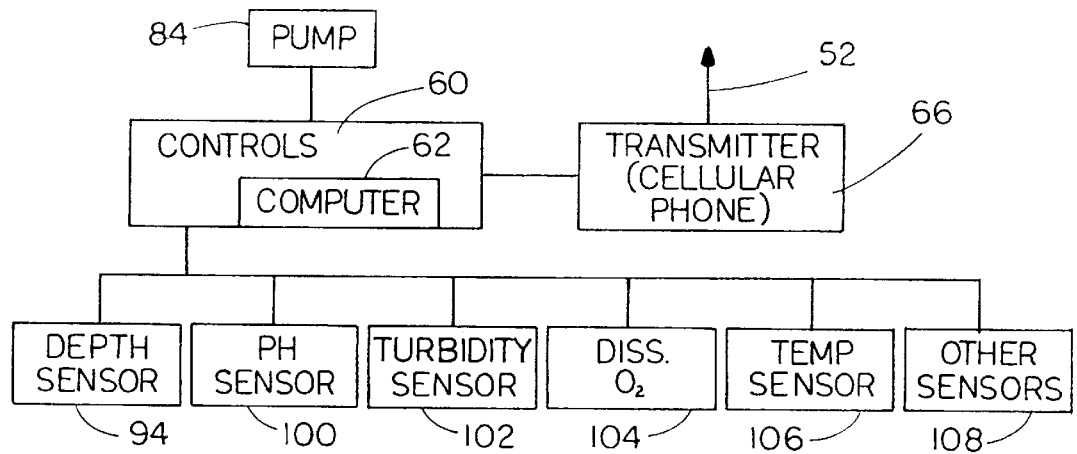
FIG. 5 is a block diagram representation of controls and instrumentation used with the present invention.

FIG. 5 indicates other sensors 108 can be used for sensing things such as fecal coliform, chlorophyll, or other parameters that can be measured with low power requirement sensors for sending signals to the computer 62.

The pump 84 is shown schematically in FIG. 5 connected to the control circuitry 60. The transmitter antenna 52 also is used for transmitting information to a remote station, which is indicated schematically at 19 in FIG. 1, or to receive commands from the remote station. The data from the sensors is generally transmitted to the remote station 19 for analyzing and interpretation, but it can be stored in the on-board computer memory and then retrieved at a time when the access panel 68 is removed. At that time a separate data port can be connected to remotely powered units for retrieving the data, or the data can be removed on disk also.

The sensor module housing 76 is also called a "sond", and a suitable unit made by Hydrolab, Inc. located in Austin, Tex. can be utilized. The sensor module can be deployed to depths of up to 200 meters, but in the present invention, depths in the range of 100 ft. have been found adequate for fresh water bodies.

The sensors utilized are selected to be suitable for the body of water. The sensors are off the shelf technology and presently they provide adequate accuracy.

The control circuitry 60 will receive and carry out instructions (sample schedules) from the remote station 19, and will conduct all communications both external and internal to the base station and to the submerged sensor module 34. The controls also control the depth control housing 36 by operating the pump 84.

Figure 6:
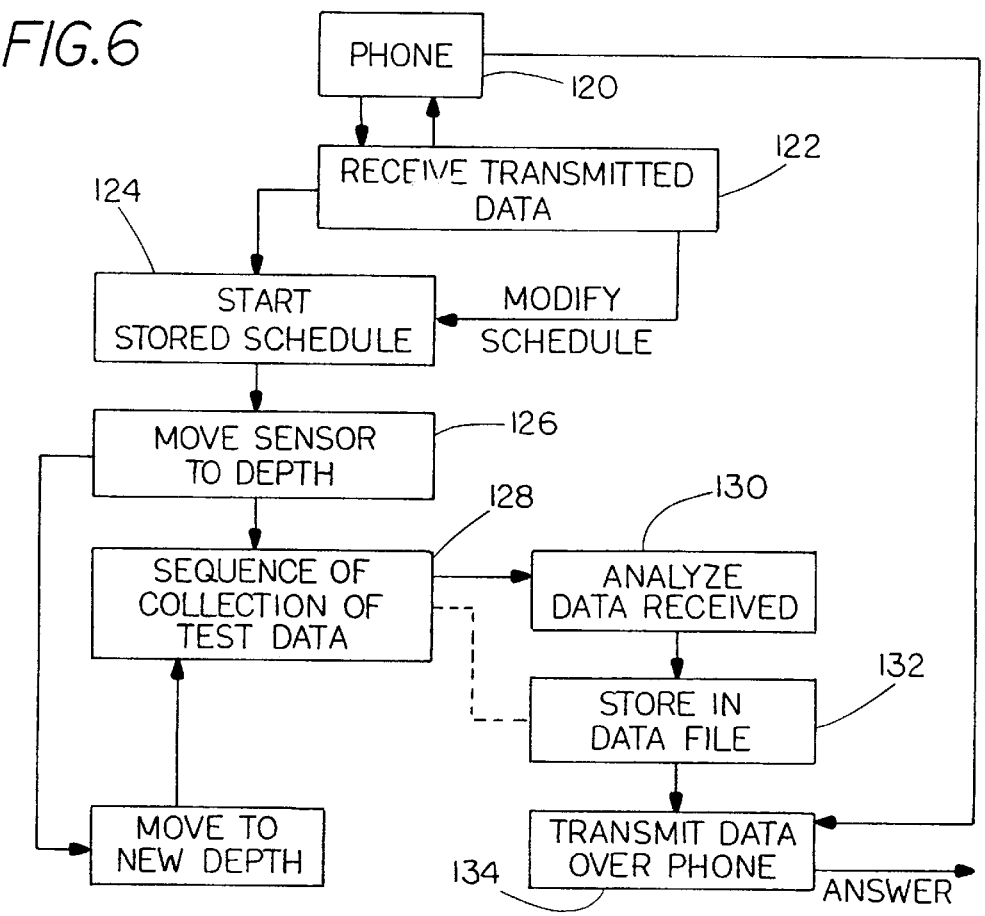
FIG. 6 is a flow chart of a typical program carried out by the computer and controls.

In FIG. 6, a flow chart is shown in schematic form for a typical initiation of a program utilizing suitable circuitry. The sampling schedule is generally stored in a computer memory, as to the individual steps that should be performed in a normal manner. Typically, a phone incoming call represented by the box 120 will be received by the computer and acknowledged by an answer sequence. The computer receives incoming data as represented by the box 122 that is transmitted over the telephone and can be a complete schedule of controls; a signal to start an already stored sample schedule, or can include modifications to the stored sample schedule. The sample schedule is generally preprogrammed into the computer, but with a programmable memory it can be changed. Otherwise the program can be in a read only memory.

Once the start signal for carrying out the sample schedule is received, as represented by the box 124, the sensor module is moved to its desired depth as shown in the box 126 by running the pump appropriately. The sequence of collecting test data on the individual sensors is started as indicated by box 128. This sequence can be to commence taking individual signals from the various sensors, such as temperature, actual depth and the like. Temperature can be taken before each reading of other parameters if desired. The information or data is received by memory and can be analyzed on board in a preselected program, as represented by step 130. The information can be stored in a data file at 132. The storing can be after the phone has hung up, or if the phone is kept active, the information can be transmitted directly from the analyzation sequence. In addition, the raw data can be transmitted back to the base station if desired. The memory used for storing in step 132 as illustrated in FIG. 6 will respond to an incoming phone call for transmission of the data after a preselected time, if desired. Once the phone is answered, the stored data will be transmitted. This is represented by the step 134.

The typical sequence of operations shown in FIG. 6 can be modified as desired to suit the existing environmental conditions.

The batteries utilized are preferably in the range of a 12 volts, with a long life, and capable of providing a continuous power supply for the needed interval.

The solar panels shown at 53, 54 and 55 lie flat on the top of the arms of the buoy 18, and because each of these arms holds one or more of the batteries, the central area in the chamber 26 is left open so there is more room for controls consisting of the telephone and computer. There can be a central processing unit used as part of the computer 62, as well as microcomputer memory boards for the various functions.

The remote underwater sampling station of the present invention is easily installed, and is relatively low cost. It can be left in place during freezing weather and even if frozen into an ice layer the system will continue to operate as long as there is adequate solar power for the solar cells to charge the batteries. The cells should not be covered with snow or ice. The depth control housing can be made to adjust in depth from just below the surface to a hundred feet or more by adequate sensing and control of pump 84. The size of the chamber in depth control housing 36 is such that it will support the sensor package 34 and permit adequate and accurate support at a desired depth.

The depth control housing could be doughnut shaped, or in other words a ring with an open center. The pump 84 could be mounted inside the ring. Also, if desired, a ring type depth control housing could surround the cable 38 for guidance.

Two pumps may be used to control buoyancy, one to pump water into chamber 70, and one to pump water out, if desired.

Although the present invention has been described with reference to preferred embodiments, workers skilled in the art will recognize that changes may be made in form and detail without departing from the spirit and scope of the invention.

What is claimed is:

1. An underwater sensing system comprising a floatable buoy;

a control circuit mounted in an interior chamber of said buoy and having leads extending therefrom;

a sensor assembly comprising at least one water quality sensor connected to said leads;

a depth control housing having an interior chamber for supporting the sensor assembly, said controls including a operating control for adjusting the buoyancy of the depth control housing to maintain the depth for positioning the water quality sensor at a desired depth.

2. The system of claim 1, wherein the depth control housing has an interior sealed chamber and at least one pump connected between said interior chamber and a body of water in which the depth control housing is placed, the pump providing liquid to the interior chamber in response to control signals to adjust the buoyancy of the depth control housing.

3. The system of claim 1, wherein said buoy has a line extending substantially vertically to a bottom of a body of water in which the buoy is floated, said line comprising a guideline for the sensor assembly, said sensor assembly sliding along said guideline as the sensor assembly is changed in depth.

4. The system of claim 1, wherein said buoy comprises a central hub and at least three radially extending arms supported on the central hub, said arms having interior sealed chambers to provide buoyancy for the buoy, and each of said arms supporting a solar cell on an upper surface thereof.

5. The system of claim 4, wherein said arms are generally planar along an upper surface thereof and said solar cells are substantially planar.

6. The system of claim 4, wherein said buoy has sufficient void volume to float above the surface of a body of water in which the sensor assembly is placed.

7. The system of claim 4, including an anchor arrangement for said buoy, comprising an anchor line attached to each of said arms at outer ends thereof, and a pair of anchor weights for each anchor line, one of the weights of each pair being substantially larger than the other, each pair of said anchor weights being joined by a second line, and the anchor lines being connected to the second line joining its associated pair of anchor weights.

8. The system of claim 1, wherein said control circuit includes a circuit portion for receiving signals from an on-board computer forming a part of said control circuit, said circuit portion being operable to transmit signals from sensors in the sensor assembly at desired times.

9. The system of claim 1, wherein the sensor assembly includes a depth sensor, the control circuit adjusting the buoyancy of the depth control housing in response to signals from the depth sensor.

10. A floating sensing system for providing signals retaining to water quality from submerged sensors comprising:

a buoy comprising a central housing having a plurality of generally radially extending arms each arm having an interior chamber, a control circuit mounted on the interior of said buoy in the central housing;

at least one water quality sensor;

a depth control housing having an interior chamber and supporting the at least one sensor; and each of the arms having an energy storage unit therein coupled to the control circuit and a solar cell supported thereon for providing energy to the energy storage unit in the same arm.

11. The sensing system of claim 10, wherein the depth control housing has at least one pump connected to selectively provide and remove liquid to and from the interior chamber in response to control signals to adjust the buoyancy of the depth control housing.

12. The sensing system of claim 10, wherein there are at least three radially extending arms.

13. An apparatus including a floating buoy:

a control circuit mounted on an interior chamber of said buoy;

a sensor support housing including at least one water quality sensor coupled to the control circuit;

a depth control housing having an interior chamber for supporting the sensor support housing including a sensor for sensing the depth of the sensor support housing, said controls including an operating control for adjusting the buoyancy of the depth control housing; and a guide line extending substantially vertically below the buoy for slidably guiding said sensor support housing as the sensor support housing is changed in depth.

14. The apparatus of claim 13, wherein said buoy comprises a central housing and at least three radially extending arms supported on the central housing, said arms having interior chambers to provide buoyancy for the buoy, and each of said arms supporting a solar cell on an upper surface thereof and having a separate battery in each arm coupled to be recharged by energy from the respective solar cell.

* * * * *